United States Patent
Deguchi et al.

(10) Patent No.: US 8,879,917 B2
(45) Date of Patent: Nov. 4, 2014

(54) TRANSMISSION SYSTEM AND TRANSMITTER

(75) Inventors: Jun Deguchi, Kawasaki (JP); Hideaki Majima, Tokyo (JP); Yuichi Nakamura, Tokyo (JP); Hisao Kawasato, Tokyo (JP); Nau Ozaki, Kawasaki (JP); Toshiyuki Yamagishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 221 days.

(21) Appl. No.: 13/599,113

(22) Filed: Aug. 30, 2012

(65) Prior Publication Data
US 2013/0242201 A1 Sep. 19, 2013

(30) Foreign Application Priority Data

Mar. 19, 2012 (JP) ................................ 2012-062347

(51) Int. Cl.
*H04B 10/00* (2013.01)
*H04N 21/4722* (2011.01)
*H04N 5/40* (2006.01)
*H04N 7/08* (2006.01)
*H04N 21/414* (2011.01)
*H04N 7/025* (2006.01)
*H04B 10/12* (2006.01)

(52) U.S. Cl.
CPC ............. *H04N 5/40* (2013.01); *H04N 21/4722* (2013.01); *H04N 7/08* (2013.01); *H04N 21/41407* (2013.01); *H04N 7/025* (2013.01)
USPC ............................ 398/130; 398/118; 398/127

(58) Field of Classification Search
CPC .................................................... H04B 10/116
USPC ................................................. 398/118–131
See application file for complete search history.

(56) References Cited

U.S. PATENT DOCUMENTS 7,830,357 B2    11/2010    Kitaoka et al.
7,948,469 B2    5/2011    Kitaoka et al.
(Continued)

FOREIGN PATENT DOCUMENTS

JP    11-17657 A    1/1999
JP    2002-190984    7/2002
(Continued)

OTHER PUBLICATIONS

Japanese Office Action issued on Jun. 3, 2014 in Japanese Application No. 2012-062347 (with English translation).

*Primary Examiner* — Daniel Dobson
(74) *Attorney, Agent, or Firm* — Oblon, Spivak, McClelland, Maier & Neustadt, L.L.P.

(57) ABSTRACT

According to one embodiment, a transmission system includes a transmitter, and a receiver. The transmitter includes one or a plurality of light sources, a modulator, a first driver, a display, and a second driver. The one or a plurality of light sources is configured to emit a visible light whose light amount corresponds to a first drive signal. The modulator is configured to, according to transmission data to be transmitted from the transmitter to the receiver, modulate a first luminance signal indicative of an amount of the light the light source is configured to emit, to generate a second luminance signal. The first driver is configured to generate the first drive signal based on the second luminance signal. A mean of the second luminance signal during one frame in the input video signal is substantially equal to a value of the first luminance signal in the frame.

20 Claims, 11 Drawing Sheets

(56) References Cited

U.S. PATENT DOCUMENTS

| | | | |
|---|---|---|---|
| 2005/0254714 A1* | 11/2005 | Anne | 382/233 |
| 2009/0002265 A1 | 1/2009 | Kitaoka et al. | |
| 2011/0018911 A1* | 1/2011 | Kitaoka et al. | 345/690 |
| 2011/0063510 A1* | 3/2011 | Lee et al. | 348/563 |
| 2012/0298752 A1* | 11/2012 | Kim | 235/437 |
| 2013/0228624 A1* | 9/2013 | Byrd et al. | 235/462.11 |

FOREIGN PATENT DOCUMENTS

| | | |
|---|---|---|
| JP | 2004-88238 A | 3/2004 |
| JP | 2007-323014 | 12/2007 |
| JP | 2008-129251 | 6/2008 |
| WO | WO 2006/011515 A1 | 2/2006 |

\* cited by examiner

TRANSMISSION SYSTEM AND TRANSMITTER

CROSS REFERENCE TO RELATED APPLICATIONS

This application is based upon and claims the benefit of priority from the prior Japanese Patent Application No. 2012-062347, filed on Mar. 19, 2012, the entire contents of which are incorporated herein by reference.

FIELD

Embodiments described herein relate generally to a transmission system and a transmitter.

BACKGROUND

On a video display apparatus, information such as a telephone number or a URL (Uniform Resource Locator) related to a displayed video image are sometimes displayed. However, since such information is superimposed on the original video image, there is a problem that it may be difficult to see the video image.

DETAILED DESCRIPTION

In general, according to one embodiment, a transmission system includes a transmitter, and a receiver configured to receive a signal transmitted by the transmitter. The transmitter includes one or a plurality of light sources, a modulator, a first driver, a display, and a second driver. The one or a plurality of light sources is configured to emit a visible light whose light amount corresponds to a first drive signal. The modulator is configured to, according to transmission data to be transmitted from the transmitter to the receiver, modulate a first luminance signal indicative of an amount of the light the light source is configured to emit, to generate a second luminance signal. The first driver is configured to generate the first drive signal based on the second luminance signal. A video depending on a second drive signal is displayed on the display using the visible light emitted by the light source. The second driver is configured to generate the second drive signal based on an input video signal. A mean of the second luminance signal during one frame in the input video signal is substantially equal to a value of the first luminance signal in the frame. The receiver includes a light receiver, and a demodulator. The light receiver is configured to receive the video displayed on the display. The demodulator is configured to demodulate the received video to reproduce the transmission data.

The following is a detailed description of embodiments, with reference to the accompanying drawings.

First Embodiment

Figure 1:
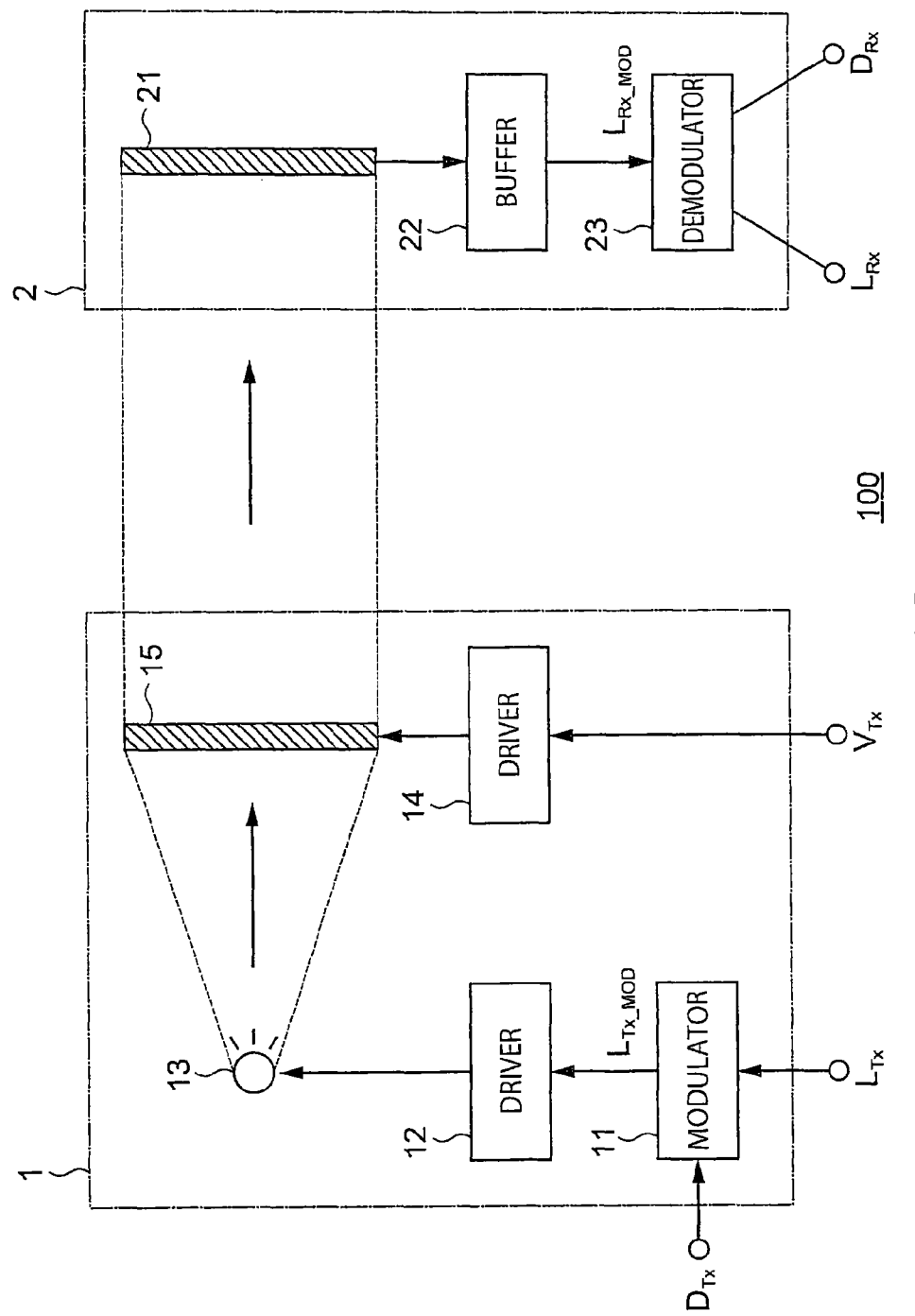
FIG. 1 is a schematic block diagram of a transmission system 100 according to a first embodiment.

FIG. 1 is a schematic block diagram of a transmission system 100 according to a first embodiment. The transmission system 100 includes a transmitter 1 and a receiver 2 that receives signals the transmitter 1 transmits.

The transmitter 1 includes a modulator 11, a driver 12, a light source 13, a driver 14, and a displaying device 15.

The modulator 11 modulates a luminance signal (a first luminance signal) $L_{Tx}$ in accordance with transmission data $D_{Tx}$, to generate a modulated luminance signal (a second luminance signal) $L_{Tx\_MOD}$. The luminance signal $L_{Tx}$ indicates the amount of light the light source 13 is to emit. The transmission data $D_{Tx}$ is, for example, the URL indicating a homepage containing the information related to an input video signal $V_{Tx}$.

The driver (a first driver) 12 generates a drive signal (a first drive signal) for driving the light source 13, based on the luminance signal $L_{Tx\_MOD}$. The light source 13 emits visible light by the amount depending on the drive signal to the displaying device 15.

The driver (a second driver) 14 generates a drive signal for driving the displaying device 15, based on the input video signal $V_{Tx}$. The displaying device 15 displays a video image depending on the input video signal $V_{Tx}$, using visible light emitted from the light source 13.

Meanwhile, the receiver 2 includes a light receiving device 21, a buffer 22, and a demodulator 23. The receiver 2 is a portable telephone with a camera function, for example.

The light receiving device 21 is a CMOS image sensor or a CCD image sensor camera, for example. The light receiving device 21 receives the video image that is displayed by using the visible light emitted from the light source 13, and converts the video image into an electrical signal $L_{Rx\_MOD}$.

The buffer 22 temporarily stores the electrical signal $L_{Rx\_MOD}$. The electrical signal $L_{Rx\_MOD}$ is equal to the modulated luminance signal $L_{Tx\_MOD}*V_{Tx}$.

The demodulator 23 demodulates the electrical signal $L_{Rx\_MOD}$ stored in the buffer 22, to generate reception data $D_{Rx}$. The reception data $D_{Rx}$ is equal to the transmission data $D_{Tx}$. Alternatively, the demodulator 23 may demodulate the electrical signal $L_{Rx\_MOD}$, to generate a luminance signal $L_{Rx}$. The luminance signal $L_{Rx}$ contains the same information as the luminance signal $L_{Tx}*V_{Tx}$.

In the above described manner, the transmission data $D_{Tx}$ transmitted from the transmitter 1 is sent as the reception data $D_{Rx}$ to the receiver 2. In the following, each of the components is described in detail.

The transmitter 1 of FIG. 1 is a liquid crystal display television, for example. In this case, the light source 13 is a light source included in a backlight device, and the displaying device 15 is a liquid crystal panel.

The light source 13 is a cold cathode fluorescent tube or a LED (Light Emitting Diode), for example. The amount of visible light the light source 13 is to emit is determined by the luminance signal $L_{Tx}$. The luminance signal $L_{Tx}$ may have a constant value, or may vary depending on the input video signal $V_{Tx}$, so as to display a video image with a higher contrast. However, the luminance signal $L_{Tx}$ is preferably constant during one frame period of the input video signal $V_{Tx}$.

Based on input video signal $V_{Tx}$, the driver 14 generates an analog voltage, as the drive signal, for controlling the liquid crystal material in the liquid crystal panel. The input video signal $V_{Tx}$, for example, may be a signal obtained by tuning and decoding broadcast waves or may be a signal stored in storage such as an optical disk or a hard disk. The frame rate of the input video signal $V_{Tx}$ is 60 Hz, for example.

The displaying device 15 is a liquid crystal panel having, for example, a structure in which a pair of glass substrates is positioned to face each other and the liquid crystal material is interposed between those glass substrates. The liquid crystal panel includes scanning lines (1080 lines, for example), signal lines (1920*3 lines, for example), and liquid crystal pixels formed at the respective intersection points between the scanning lines and the signal lines. The orientation of the liquid crystal material in the liquid crystal pixels varies depending on the drive signal generated by the driver 14. Among the visible light emitted from the light source 13, light with the intensity corresponding to the orientation of the liquid crystal material passes through the liquid crystal material, and the video image corresponding to the drive signal, that is, the input video signal $V_{Tx}$ is displayed on the displaying device 15.

The transmitter 1 is, of course, not limited to a liquid crystal display television, and may be an apparatus that displays video images using visible light emitted from the light source 13. For example, the transmitter 1 may be a liquid crystal projector or the like, and the displaying device 15 may be an imaging device of a transmission type or a reflection type.

In the case of a liquid crystal projector of a transmission type, for example, visible light emitted from the light source 13 is divided into red light, green light, and blue light by a dichroic mirror. Liquid crystal panels are provided for the respective colors of light, and allow the light to pass therethrough in accordance with a drive signal. The red light, the green light, and the blue light that have passed through the liquid crystal panels are combined by a prism, and are projected on an outside screen or the like via a lens. In this case, the liquid crystal panels correspond to the displaying device 15. However, the video image is not displayed on the displaying device 15, but the light projected from the displaying device 15 is displayed on the outside. Optical elements such as mirror, lens, and prism may be provided between the light source 13 and the displaying device 15, and between the displaying device 15 and the light receiving device 21, or the like.

Figure 2:
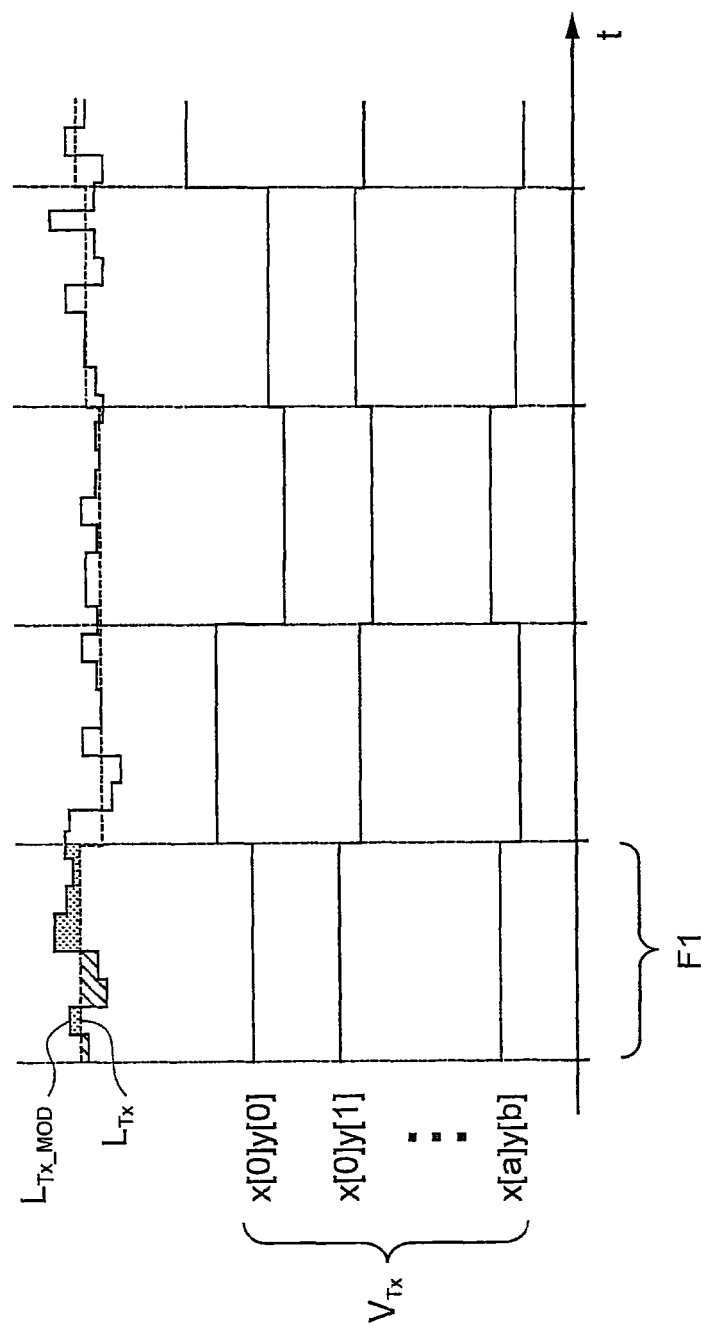
FIG. 2 is a waveform chart for explaining operations of the modulator 11.

FIG. 2 is a waveform chart for explaining operations of the modulator 11, which is one of the features of this embodiment. In the waveform chart, the horizontal axis indicates time, and the vertical axis indicates the values of the luminance signals $L_{Tx}$ (the dashed line) and $L_{Tx\_MOD}$ (the solid line), and the value of each pixel signal x[j]y[k] in the input video signal $V_{Tx}$. A pixel signal x[j]y[k] means a j-th (in the horizontal direction) and k-th (in the vertical direction) pixel, and the resolution of the displaying device 15 is "a" pixels in the horizontal direction and "b" pixels in the vertical direction in this example.

The modulator 11 modulates the luminance signal $L_{Tx}$ so that the value of the unmodulated luminance signal $L_{Tx}$ and the mean value of the modulated luminance signal $L_{Tx\_MOD}$ become equal to each other in one frame period of the input video signal $V_{Tx}$. That is, in a frame F1 of FIG. 2, the total area of the shaded regions is equal to the total area of the dotted regions.

The modulator 11 also modulates the luminance signal $L_{Tx}$ at a frequency equal to or higher than a predetermined frequency. The human eye cannot recognize a change in the light amount at frequencies equal to or higher than a certain frequency (about 100 Hz, for example), but recognizes the mean value. Therefore, by modulating at a high frequency, the light amount corresponding to the unmodulated luminance signal $L_{Tx}$ is recognized. In other words, while the modulation of the luminance signal $L_{Tx}$ is not recognized, the displaying device 15 can display a video image corresponding to the input video signal $V_{Tx}$.

The modulator 11 performs encoding, primary modulation, secondary modulation, and frequency conversion on the transmission data $D_{Tx}$, if necessary. The modulator 11 may perform Manchester encoding, 10b/8b conversion, PPM (pulse position modulation), or PWM (pulse width modulation). As the primary modulation, analog amplitude modulation or amplitude shift keying may be performed. The encoding and modulation manners are not limited to the above mentioned examples. More specific examples will be described in third embodiment and later.

When light corresponding to the modulated light signal $L_{Tx\_MOD}$ is emitted from the light source 13 of the transmitter 1, the demodulator 23 of the receiver 2 performs the operation opposite of that of the modulator 11 on the received electrical signal $L_{Rx\_MOD}$, to generate the reception data $D_{Rx}$, which is equal to the transmission data $D_{Tx}$. Also, the modulator 11 may generate the luminance signal $L_{Rx}$ by calculating the mean value of the electrical signal $L_{Rx\_MOD}$ by each frame.

Figure 3:
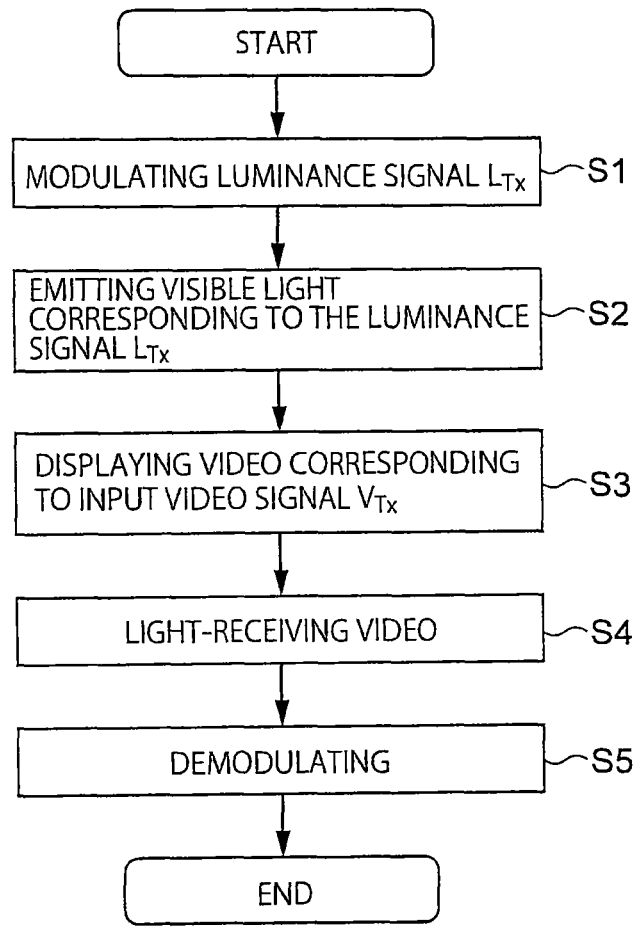
FIG. 3 is a flowchart showing an example of the processing operation of the transmission system 100 of FIG. 1.

FIG. 3 is a flowchart showing an example of the processing operation of the transmission system 100 of FIG. 1. First, the modulator 11 of the transmitter 1 modulates the luminance signal $L_{Tx}$ in accordance with the transmission data $D_{Tx}$, to generate the modulated luminance signal $L_{Tx\_MOD}$ (step S1). The driver 12 drives the light source 13, based on the modulated luminance signal $L_{Tx\_MOD}$, and the light source 13 emits visible light containing information about the transmission data $D_{Tx}$ (step S2). Using the visible light, the displaying device 15 displays the video image corresponding to the input video signal $V_{Tx}$ (step S3).

The light receiving device 21 of the receiver 2 receives the video image for which the visible light, that is emitted from the light source 13 and contains the information about the transmission data $D_{Tx}$, is used (step S4). The demodulator 23 then performs a demodulating operation, to generate the reception data $D_{Rx}$ (step S5).

As described above, in the first embodiment, information is transmitted by using visible light that is modulated in accordance with the transmission data $D_{Tx}$. At this point, the modulation is performed so that the mean value of the amount of modulated visible light in one frame becomes equal to the amount of unmodulated visible light. Accordingly, information can be transmitted while influence on the video image displayed by the displaying device 15 is minimized.

Although only one light source 13 is shown in FIG. 1, more than one light source 13 may be used.

Figure 4:
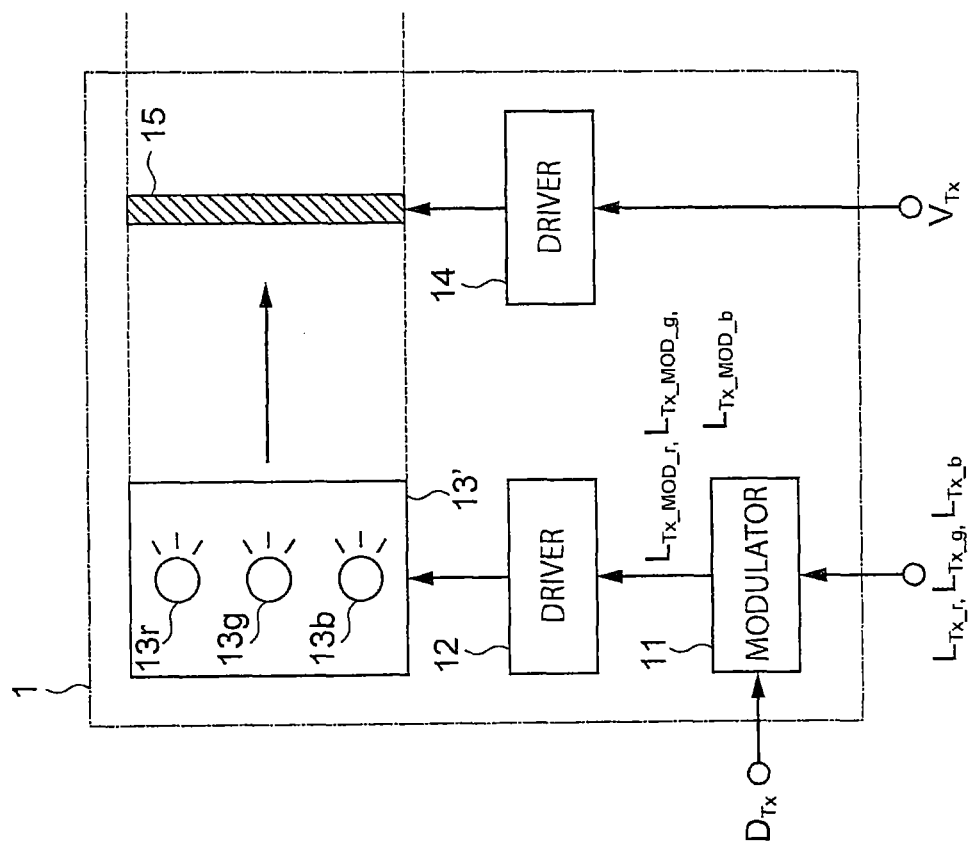
FIG. 4 is a schematic block diagram of the transmitter 1 including more than one light source.

FIG. 4 is a schematic block diagram of the transmitter 1 including more than one light source. The light source module 13' shown in this diagram includes one or more light sources. In a case where the light source module 13' includes more than one light source, the light sources may be of the same type, or may be of different types that emit different colors. The light source module 13' in FIG. 4 shows an example that includes at least one light source 13r that emits red light, at least one light source 13g that emits green light, and at least one light source 13b that emits blue light. Each of the light sources is a LED, for example. Such a transmitter 1 may be a portable projector that uses light sources of the three colors of RGB, for example.

In that case, the luminance signal may include a luminance signal $L_{Tx\_r}$ for the light source 13r, a luminance signal $L_{Tx\_g}$ for the light source 13g, and a luminance signal $L_{Tx\_b}$ for the light source 13b. The modulator 11 modulates the respective luminance signals in accordance with the transmission data $D_{Tx}$, to generate modulated luminance signals $L_{Tx\_MOD\_r}$, $L_{Tx\_MOD\_g}$, and $L_{Tx\_MOD\_b}$. Based on the modulated luminance signals $L_{Tx\_MOD\_r}$, $L_{Tx\_MOD\_g}$, and $L_{Tx\_MOD\_b}$, the driver 12 generates drive signals for driving the light sources 13r, 13g, and 13b.

Figure 5:
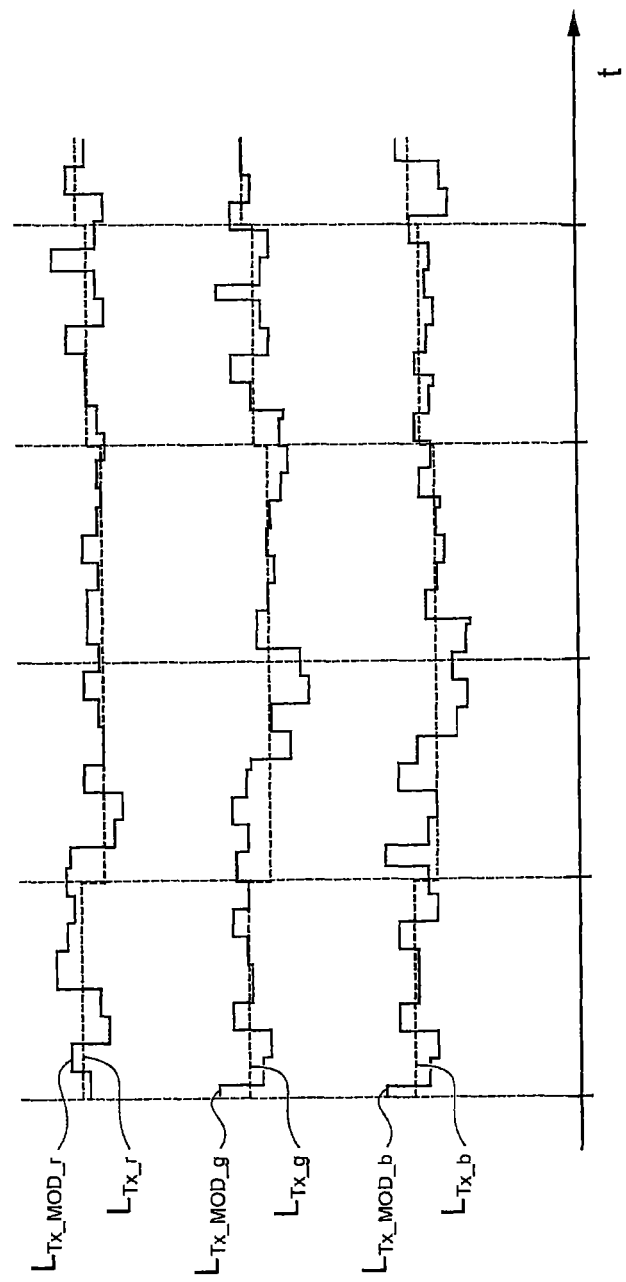
FIG. 5 is a diagram for explaining operations of the modulator 11 in the transmitter 1 of FIG. 4.

FIG. 5 is a diagram for explaining operations of the modulator 11 in the transmitter 1 of FIG. 4. As indicated by the luminance signals $L_{Tx\_r}$, $L_{Tx\_g}$, and $L_{Tx\_b}$ in FIG. 5, the light sources 13r, 13g, and 13b emit light in synchronization with one another, and the light emission changes by the frame as a unit. The modulator 11 modulates each luminance signal in accordance with the transmission data $D_{Tx}$. At this point, the modulator 11 can increase the transmittable data amount by performing different modulating operations from one another on the luminance signals $L_{Tx\_r}$, $L_{Tx\_g}$, and $L_{Tx\_b}$. Alternatively, the modulator 11 may perform the same modulating operations on the luminance signals $L_{Tx\_r}$, $L_{Tx\_g}$, and $L_{Tx\_b}$ so that the transmission data $D_{Tx}$ can be transmitted with a higher degree of certainty.

In the case where the transmitter 1 includes the different light sources 13r, 13g, and 13b, the light receiving device 21 of the receiver 1 receives and converts the respective colors of light into electrical signals $L_{Rx\_MOD\_r}$, $L_{Rx\_MOD\_g}$, and $L_{Rx\_MOD\_b}$.

Second Embodiment

In the above described first embodiment, the luminance signal $L_{Tx}$ is modulated in accordance with the transmission data $D_{Tx}$. In a second embodiment described below, on the other hand, the input video signal $V_{Tx}$ is modulated in accordance with the transmission data $D_{Tx}$.

Figure 6:
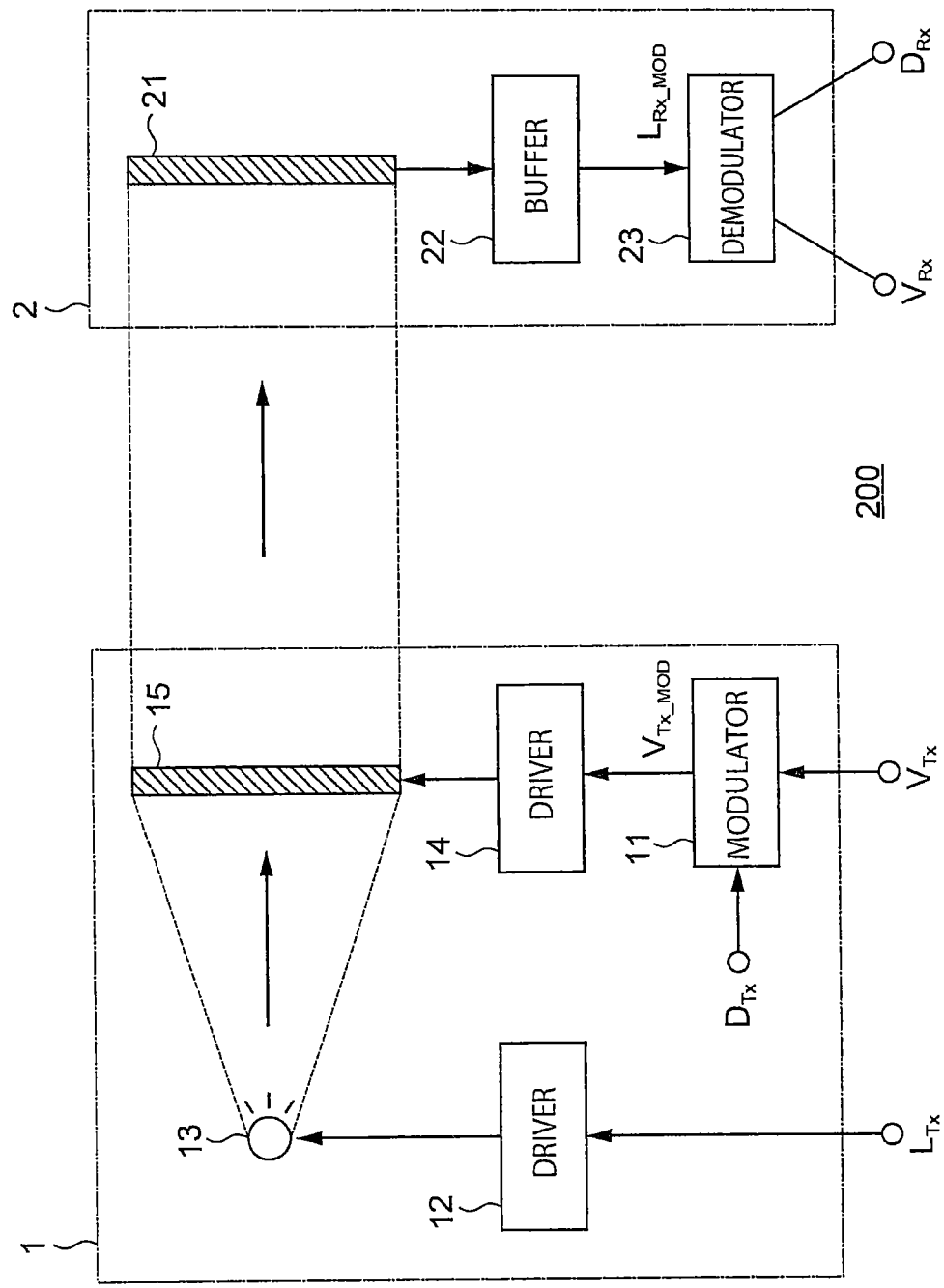
FIG. 6 is a schematic block diagram of a transmission system 200 according to the second embodiment.

FIG. 6 is a schematic block diagram of a transmission system 200 according to the second embodiment. In FIG. 6, the same components as those in FIG. 1 are denoted by the same reference numerals as those used in FIG. 1, and the different aspects will be mainly described in the following.

A modulator 11 of a transmitter 1 of the present embodiment modulates an input video signal (a first video signal) $V_{Tx}$ in accordance with transmission data $D_{Tx}$, to generate a modulated video signal (a second video signal) $V_{Tx\_MOD}$. Based on the modulated video signal $V_{Tx\_MOD}$, a driver 14 generates a drive signal for driving a displaying device 15. Meanwhile, based on an unmodulated luminance signal $L_{Tx}$, a driver 12 generates a drive signal for driving the light source 13.

As a result, the displaying device 15 displays a video image corresponding to the modulated video signal $V_{Tx\_MOD}$, using (unmodulated) visible light emitted from the light source 13.

Meanwhile, a demodulator 23 of a receiver 2 demodulates an electrical signal $L_{Rx\_MOD}$ stored in a buffer 22, to generate reception data $D_{Rx}$, which is equal to the transmission data $D_{Tx}$. Alternatively, the demodulator 23 may demodulate the electrical signal $L_{Rx\_MOD}$, to generate a video signal $V_{Rx}$, which is equal to the input video signal $V_{Tx}$.

Figure 7:
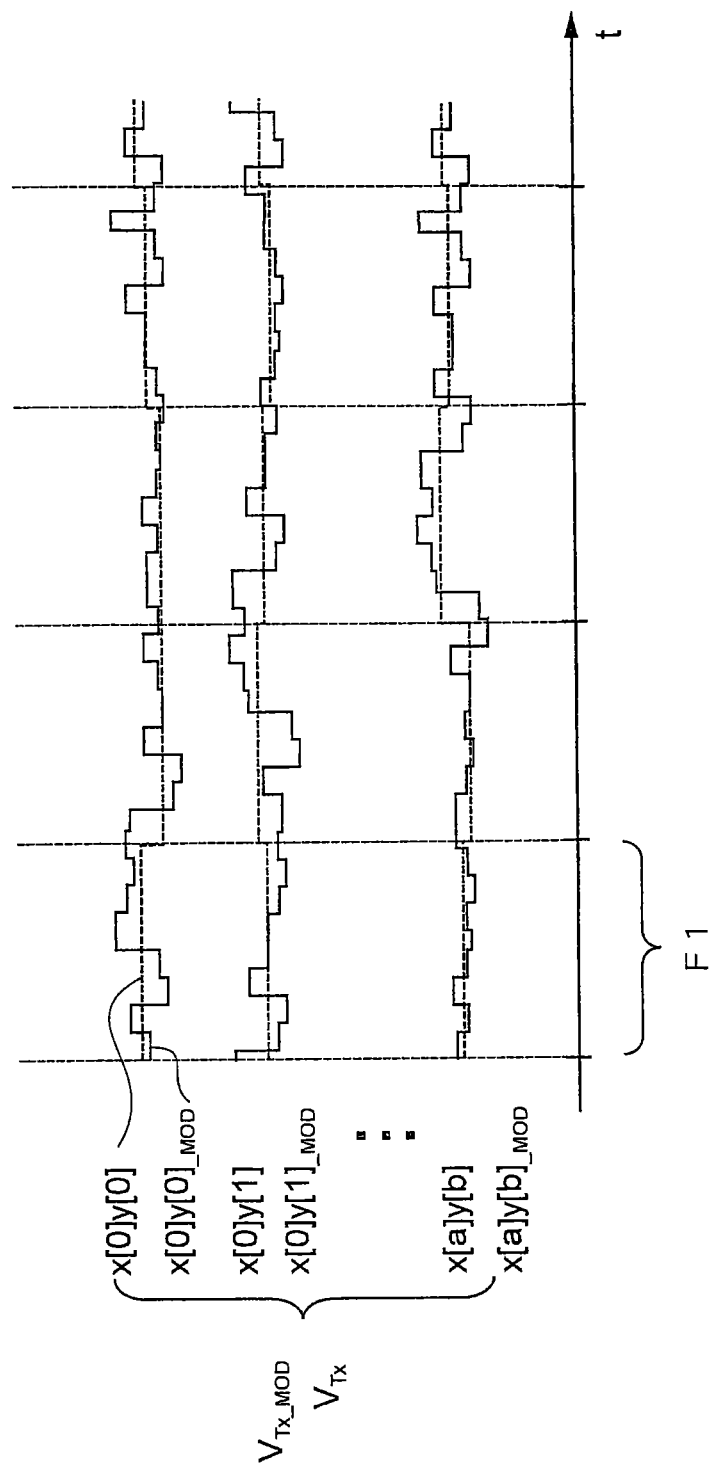
FIG. 7 is a waveform chart for explaining operations of the modulator 11.

FIG. 7 is a waveform chart for explaining operations of the modulator 11. In the waveform chart, the horizontal axis indicates time, and the vertical axis indicates the value of each pixel signal x[j]y[k] (dashed lines) in the input video signal $V_{Tx}$ and the value of each pixel signal x[j]y[k]$_{MOD}$ (solid lines) in the modulated video signal $V_{Tx\_MOD}$. The modulator 11 of the present embodiment modulates the value of each pixel signal in accordance with the transmission data $D_{Tx}$.

The modulator 11 modulates the input video signal $V_{Tx}$ so that the value of each pixel signal of the unmodulated input video signal $V_{Tx}$ in one frame period of the input video signal $V_{Tx}$ becomes equal to the mean value of the values of the corresponding pixel signals of the modulated video signal $V_{Tx\_MOD}$ in the corresponding frame. That is, in a frame F1, the value of the pixel signal x[j]y[k] of the unmodulated input video signal $V_{Tx}$ is constant. The modulator 11 modulates this value in accordance with the transmission data $D_{Tx}$, to generate the pixel signal x[j]y[k]$_{MOD}$ of the video signal $V_{Tx\_MOD}$. Here, in the frame F1, the time mean value of the pixel signal x[j]y[k]$_{MOD}$ is equal to the value of the pixel signal x[j]y[k].

In this embodiment, the modulator 11 also modulates the input video signal $V_{Tx}$ at a frequency equal to or higher than a predetermined frequency, so as not to be recognized by the human eye.

In the above described manner, while the modulation of the input video signal $V_{Tx}$ is not recognized, the displaying device 15 can display a video image corresponding to the video signal $V_{Tx\_MOD}$, as in the first embodiment. An example of the displaying device 15 that can realize such a function is a digital micromirror device in which the micro mirrors for reflecting light emitted from the light source 13 are provided, the number of the micro mirrors being equal to the number of pixels.

When the displaying device 15 of the transmitter 1 displays the video image corresponding to the modulated video signal $V_{Tx\_MOD}$, the demodulator 23 of the receiver 2 performs the operation opposite of that of the modulator 11 on the received electrical signal $L_{Rx\_MOD}$, to generate the reception data $D_{Rx}$, which is equal to the transmission data $D_{Tx}$. Also, the modulator 11 may generate the luminance signal $L_{Rx}$ by calculating the mean value of the electrical signal $L_{Rx\_MOD}$ by each frame.

Figure 8:
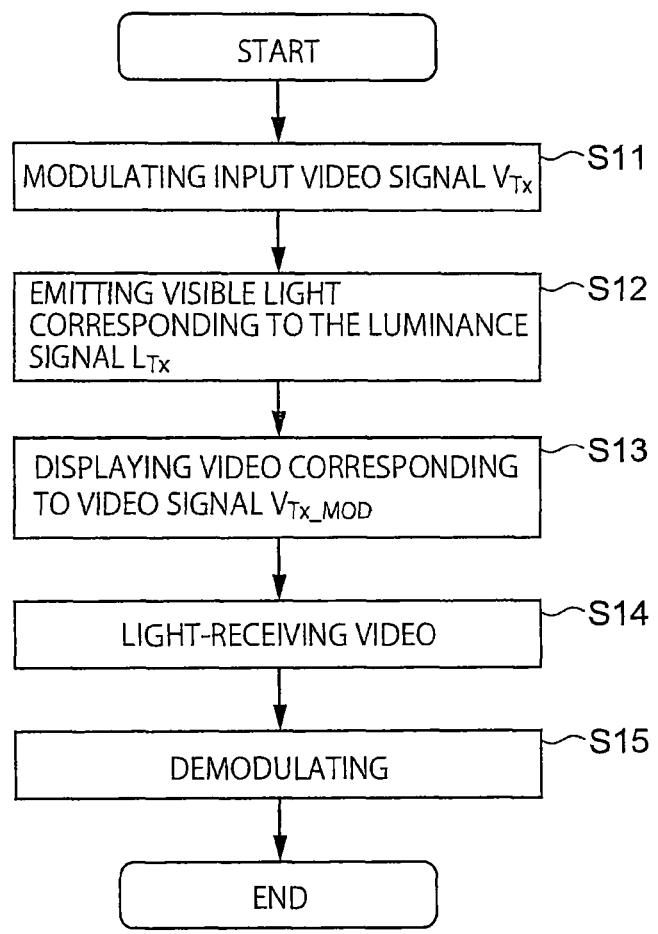
FIG. 8 is a flowchart showing an example of processing operation of the transmission system 200 of FIG. 6.

FIG. 8 is a flowchart showing an example of processing operation of the transmission system 200 of FIG. 6. First, the modulator 11 of the transmitter 1 modulates the input video signal $V_{Tx}$ in accordance with the transmission data $D_{Tx}$, to generate the modulated video signal $V_{Tx\_MOD}$ (step S11). The driver 12 drives the light source 13, based on the luminance signal $L_{Tx}$, and the light source 13 emits visible light (step S12). Using the visible light, the displaying device 15 displays the video image corresponding to the video signal $V_{Tx}$ containing the information about the transmission data $D_{Tx}$ (step S13).

The light receiving device 21 of the receiver 2 receives the video image for which the visible light, that is emitted from the light source 13 and contains the information about the transmission data $D_{Tx}$, is used (step S14). The demodulator 23 then performs a demodulating operation, to generate the reception data $D_{Rx}$ (step S15).

As described above, in the second embodiment, information is transmitted by using a video image that is modulated in accordance with the transmission data $D_{Tx}$. At this point, the modulation is performed so that the mean value of the pixel signals in the modulated video signal $V_{Tx\_MOD}$ in one frame becomes equal to the pixel signal value in the unmodulated input video signal $V_{Tx}$. Accordingly, information can be transmitted while influence on the video image displayed by the displaying device 15 is minimized. Also, as each pixel signal is modulated, the transmittable amount of the transmission data $D_{Tx}$ becomes larger.

Third Embodiment

In the following embodiments, specific examples of the modulator 11 and the demodulator 23 will be described. Examples of the modulator 11 that modulates the luminance signal $L_{Tx}$ in accordance with transmission data $D_{Tx}$ (the first embodiment) are described below, but an input video signal $V_{Tx}$ can also be modulated in accordance with the transmission data $D_{Tx}$ by using the same modulator 11 (the second embodiment).

Figure 9:
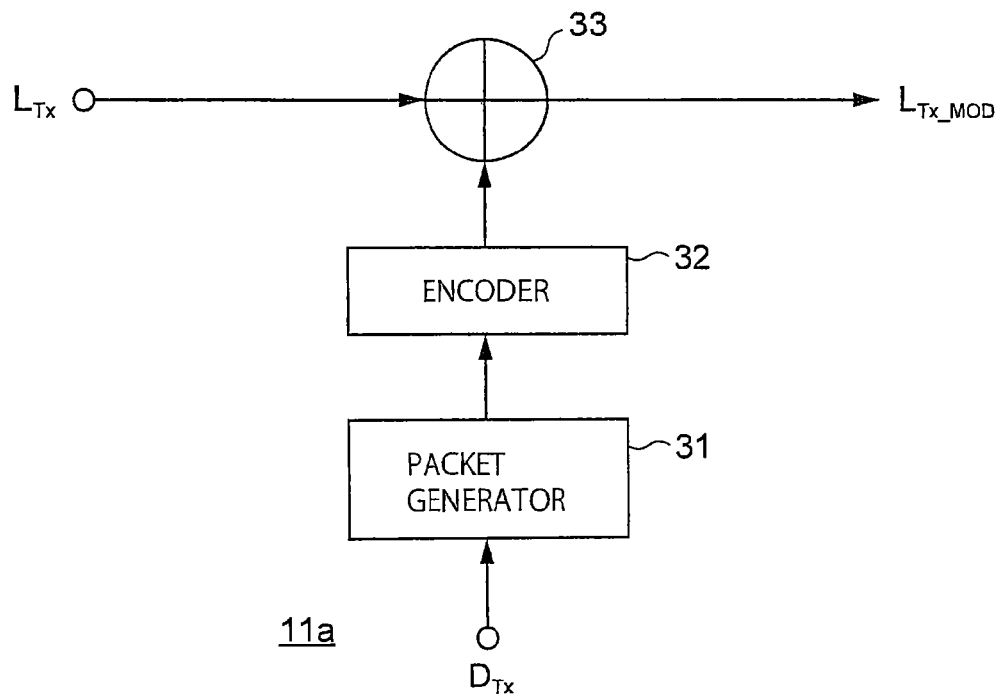
FIG. 9 is a schematic block diagram showing a first example of the modulator 11.

FIG. 9 is a schematic block diagram showing a first example of the modulator 11. A modulator 11a includes a packet generator 31, an encoder 32, and an adder 33. In FIG. 9, a transmitter 1 is assumed to transmit a baseband signal to a receiver 2. In a case where a passband signal is transmitted, however, an output signal of the modulator 11a in FIG. 9 is multiplied by a carrier signal, to generate the passband signal.

The packet generator 31 divides the transmission data $D_{Tx}$ into predetermined units in advance, and adds a header and error correction information or the like to the divided data, to generate a packet. The encoder 32 encodes the generated packet. The adder 33 adds the luminance signal $L_{Tx}$ to the encoded packet, to generate a modulated luminance signal $L_{Tx\text{-}MOD}$.

Here, the mean value of the modulated luminance signal $L_{Tx\text{-}MOD}$ in one frame is made equal to the value of the unmodulated luminance signal $L_{Tx}$, as described above. To do so, the encoder 32 encodes the packet in such a manner that the mean value in one frame becomes zero.

For example, the encoder 32 performs Manchester encoding on the packet. That is, a high-level signal in the packet is encoded to a signal which switches from "1" to "−1," and a low-level signal in the packet is encoded to a signal which switches from "−1" to "1."

Also, the encoder 32 may perform a 10b/8b conversion on the packet. That is, the packet is formed with 8 bits. The 8 bits are divided into a first group including 3 bits and a second group including 5 bits, and one bit is added to each group, to form a 10-bit signal. By adjusting the added one bit appropriately, the mean value in one frame can be zero.

Alternatively, the encoder 32 may perform PPM (Pulse Position Modulation) on the packet. PPM stands for pulse position modulation, but is sometimes referred to as pulse phase modulation. The data in the packet is represented by the position (phase) of a pulse with a constant width. For example, in a case where the input packet has four digits (2 bits), "0001" is assigned to an input "3," "0100" is assigned to an input "2," "0010" is assigned to an input "1,", and "1000" is assigned to an input "0."

Also, the encoder 32 may perform PWM (Pulse Width Modulation) on the packet. In PWM, the data in the packet is represented by the width of a pulse. In a case where the input data has four digits (two bits), for example, "1111" is assigned to an input "3," "1110" is assigned to an input "2," "1100" is assigned to an input "1," and "1000" is assigned to an input "0."

In the above described manner, the modulator 11a can generate the modulated luminance signal $L_{Tx\_MOD}$ in accordance with the transmission data $D_{Tx}$, while keeping a constant mean value in one frame.

Figure 10:
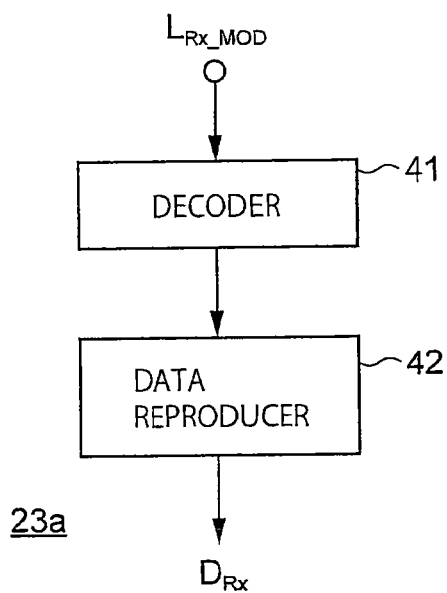
FIG. 10 is a schematic block diagram showing a first example of the demodulator 23.

FIG. 10 is a schematic block diagram showing a first example of the demodulator 23. A demodulator 23a includes a decoder 41 and a data reproducer 42. In this diagram, the receiver 2 is assumed to receive a baseband signal from the transmitter 1. In a case where the receiver 2 is to receive a passband signal, however, the passband signal is first multiplied by a carrier signal, and the respective operations shown in the diagram may be then performed.

The decoder 41 performs the operations opposite of those of the encoder 32 and the adder 33 on the electrical signal $L_{Rx\_MOD}$ corresponding to the modulated luminance signal $L_{Tx\_MOD}$, to generate a packet. That is, the decoder 41 calculates the mean value of the input electrical signal $L_{Rx\_MOD}$ by each one frame, to generate the luminance signal $L_{Rx}$. The decoder 41 then removes the luminance signal $L_{Rx}$ from the electrical signal $L_{Rx\_MOD}$, to perform the operation opposite of that of the encoder 32.

The data reproducer 42 performs an error correction on the generated packet, if necessary. The data reproducer 42 then removes the header and the error correction information or the like, to generate the reception data $D_{Rx}$.

In the above described manner, the demodulator 23a can generate the reception data $D_{Rx}$, which is equal to the transmission data $D_{Tx}$.

As described above, in the third embodiment, the transmission data $D_{Tx}$ is encoded and is superimposed on luminance data. Since the transmission data $D_{Tx}$ to be modulated and the modulated signals have one-to-one correspondence, the structures of the modulator 11a and the demodulator 23a can be made relatively small.

Fourth Embodiment

A fourth embodiment is a modification of the third embodiment, and the differences between these two embodiments will be mainly described below.

Figure 11:
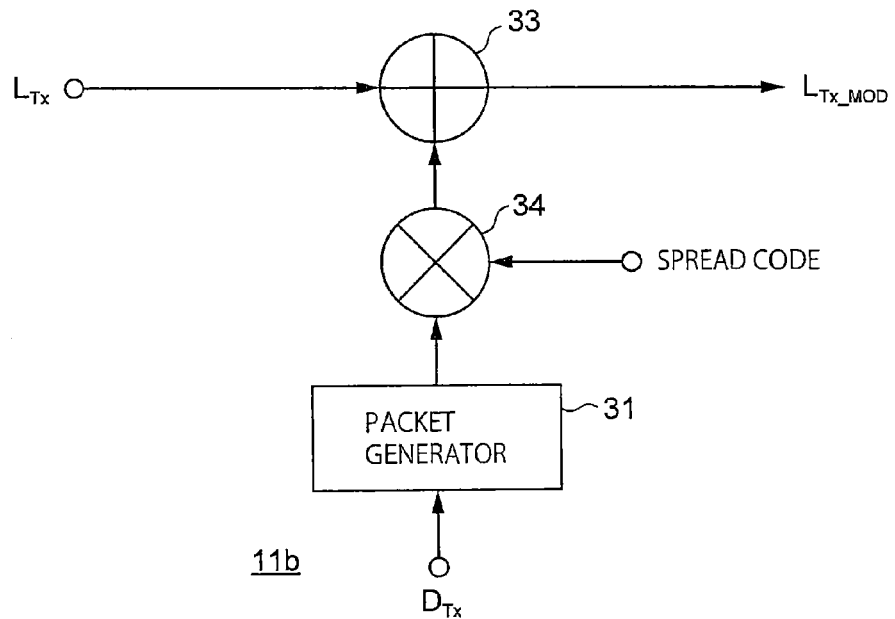
FIG. 11 is a schematic block diagram showing a second example of the modulator 11.

FIG. 11 is a schematic block diagram showing a second example of the modulator 11. A modulator 11b includes a packet generator 31, a multiplier 34, and an adder 33. The multiplier 34 multiplies a packet by a spread code such as an M-sequence or a GOLD code or the like. The adder 33 adds the output of the multiplier 34 to a luminance signal $L_{Tx}$, to generate a modulated luminance signal $L_{Tx\_MOD}$.

Figure 12:
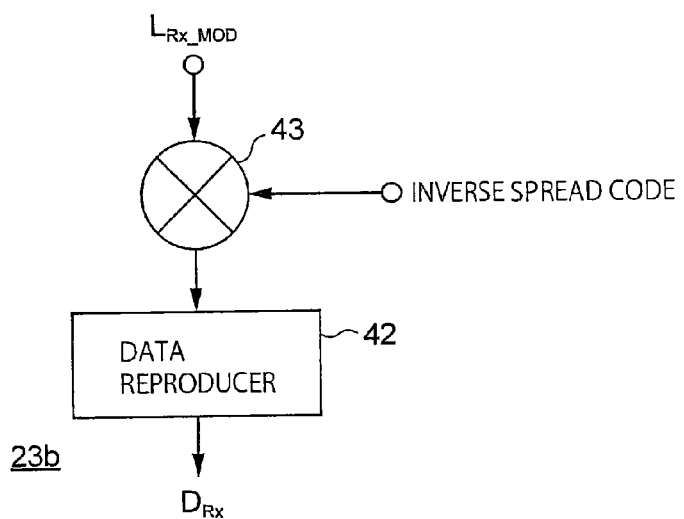
FIG. 12 is a schematic block diagram showing a second example of the demodulator 23.

FIG. 12 is a schematic block diagram showing a second example of the demodulator 23. A demodulator 23b includes a multiplier 43 and a data reproducer 42. The multiplier 43 multiplies the electrical signal $L_{Rx\_MOD}$ corresponding to the modulated luminance signal $L_{Tx\_MOD}$ by an inverse spread code, to generate a packet. The data reproducer 42 reproduces the generated packet, to generate reception data $D_{Rx}$.

As described above, in the fourth embodiment, the transmission data $D_{Tx}$ is spread and is then superimposed on luminance data. Since data is inversely spread and is reproduced at the time of reception, influence of ambient noise is minimized.

Also, since the randomness of the modulated signals is high, the influence on video images can be further reduced.

Fifth Embodiment

A fifth embodiment is another modification of the third embodiment, and the differences between these two embodiments will be mainly described below.

Figure 13:
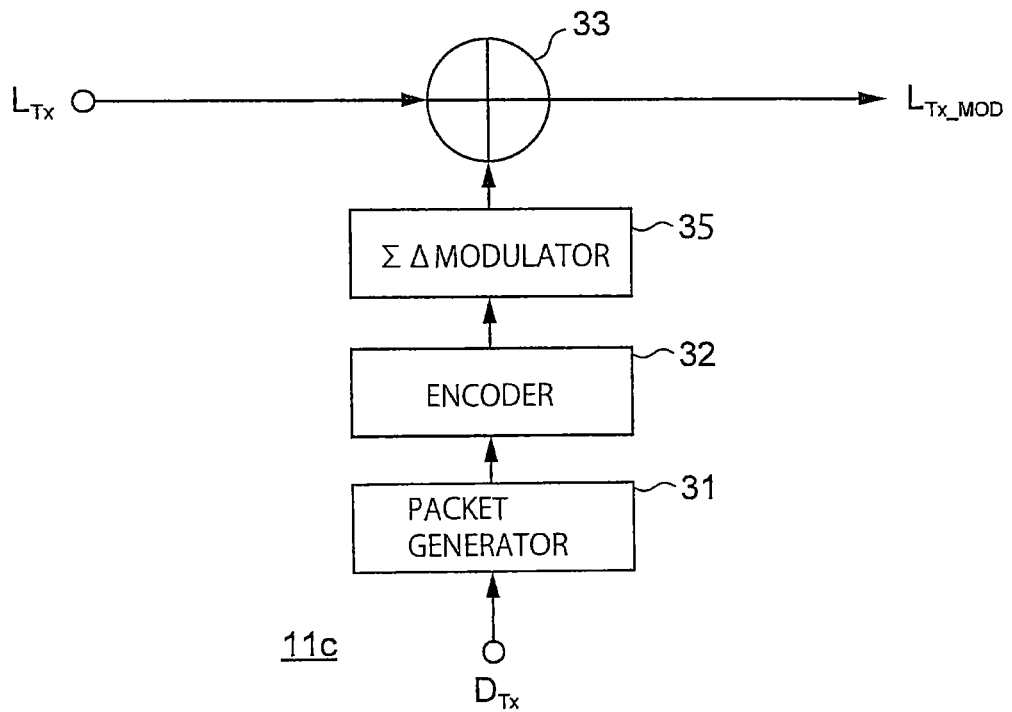
FIG. 13 is a schematic block diagram showing a third example of the modulator 11.

FIG. 13 is a schematic block diagram showing a third example of the modulator 11. A modulator 11c includes a packet generator 31, an encoder 32, a ΔΣ modulator 35, and an adder 33. The ΔΣ modulator 35 performs ΔΣ modulation on a packet encoded by the encoder 32. In this manner, a pulse density that is proportional to the code to be input to the ΔΣ modulator 35 is obtained. The adder 33 adds the output of the ΔΣ modulator 35 to a luminance signal $L_{Tx}$, to generate a modulated luminance signal $L_{Tx\_MOD}$.

Figure 14:
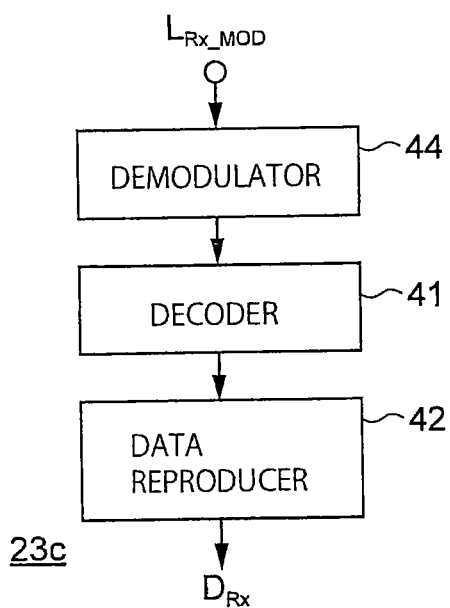
FIG. 14 is a schematic block diagram showing a third example of the demodulator 23.

FIG. 14 is a schematic block diagram showing a third example of the demodulator 23. A demodulator 23c includes a demodulator 44, a decoder 41, and a data reproducer 42. The demodulator 44 demodulates the electrical signal $L_{Rx\_MOD}$ corresponding to the modulated luminance signal $L_{Tx\_MOD}$, to obtain a signal proportional to the pulse density. The decoder 41 decodes the output of the demodulator 44, to generate a packet. The data reproducer 42 reproduces the generated packet, to generate reception data $D_{Rx}$.

As described above, in the fifth embodiment, the transmission data $D_{Tx}$ is subjected to ΔΣ modulation and is then superimposed on luminance data. Since data is averaged and is reproduced at the time of reception, influence of ambient noise is minimized. Also, since the randomness of the modulated signals is high, the influence on video images can be further reduced.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. A transmission system comprising:
    a transmitter: and
    a receiver configured to receive a signal transmitted by the transmitter;
    wherein the transmitter comprises:
    one or a plurality of light sources configured to emit a visible light whose light amount corresponds to a first drive signal;
    a modulator configured to, according to transmission data to be transmitted from the transmitter to the receiver, modulate a first luminance signal indicative of an amount of the light the light source is configured to emit, to generate a second luminance signal;
    a first driver configured to generate the first drive signal based on the second luminance signal;
    a display on which a video depending on a second drive signal using the visible light emitted by the light source; and
    a second driver configured to generate the second drive signal based on an input video signal,
    wherein a mean of the second luminance signal during one frame in the input video signal is substantially equal to a value of the first luminance signal in the frame, and
    wherein the receiver comprises:
    a light receiver configured to receive the video displayed on the display; and
    a demodulator configured to demodulate the received video to reproduce the transmission data.

2. The system of claim 1, wherein the modulator is configured to modulate the first luminance signal such that the transmission data is not recognized by human.

3. The system of claim 1, wherein the modulator is configured to modulate the first luminance signal with a frequency which is not recognized by human.

4. The system of claim 1, wherein the modulator is configured to modulate the first luminance signal with a frequency equal to or higher than 100 Hz.

5. The system of claim 1, wherein the modulator is configured to:
    according to first transmission data to be transmitted from the transmitter to the receiver, modulate the first luminance signal indicative of an amount of the light a first light source among the plurality of light sources is configured to emit, to generate the second luminance signal for the first light source; and
    according to second transmission data to be transmitted from the transmitter to the receiver, modulate the first luminance signal indicative of an amount of the light a second light source among the plurality of light sources is configured to emit, to generate the second luminance signal for the second light source.

6. The system of claim 1, wherein the demodulator is configured to demodulate the received video to reproduce the first luminance signal.

7. The system of claim 6, wherein the demodulator is configured to reproduce the first luminance signal based on a mean of luminance of each frame of the received video.

8. A transmitter comprising:
    one or a plurality of light sources configured to emit a visible light whose light amount corresponds to a first drive signal;
    a modulator configured to, according to transmission data to be transmitted to a receiver, modulate a first luminance signal indicative of an amount of the light the light source is configured to emit, to generate a second luminance signal;
    a first driver configured to generate the first drive signal based on the second luminance signal;
    a display on which a video depending on a second drive signal using the visible light emitted by the light source; and
    a second driver configured to generate the second drive signal based on an input video signal,
    wherein a mean of the second luminance signal during one frame in the input video signal is substantially equal to a value of the first luminance signal in the frame.

9. The transmitter of claim 8, wherein the modulator is configured to modulate the first luminance signal such that the transmission data is not recognized by human.

10. The transmitter of claim 8, wherein the modulator is configured to modulate the first luminance signal with a frequency which is not recognized by human.

11. The transmitter of claim 8, wherein the modulator is configured to:
    according to first transmission data to be transmitted to the receiver, modulate the first luminance signal indicative of an amount of the light a first light source among the plurality of light sources is configured to emit, to generate the second luminance signal for the first light source; and
    according to second transmission data to be transmitted to the receiver, modulate the first luminance signal indicative of an amount of the light a second light source among the plurality of light sources is configured to emit, to generate the second luminance signal for the second light source.

12. A transmission system comprising:
a transmitter: and
a receiver configured to receive a signal transmitted by the transmitter;
wherein the transmitter comprises:
one or a plurality of light sources configured to emit a visible light whose light amount corresponds to a first drive signal;
a first driver configured to generate the first drive signal based on a luminance signal indicative of an amount of the light the light source is configured to emit;
a display on which a video depending on a second drive signal using the visible light emitted by the light source;
a modulator configured to, according to transmission data to be transmitted from the transmitter to the receiver, modulate a first video signal indicative of a video configured to be displayed on the display, to generate a second video signal; and
a second driver configured to generate the second drive signal based on the second video signal,
wherein a mean of each pixel signal value in the second video signal during one frame in the first video signal is substantially equal to a corresponding pixel signal value in the frame in the first video signal;
wherein the receiver comprises:
a light receiver configured to receive the video displayed on the display; and
a demodulator configured to demodulate the received video to reproduce the transmission data.

13. The system of claim 12, wherein the modulator is configured to modulate the first video signal such that the transmission data is not recognized by human.

14. The system of claim 12, wherein the modulator is configured to modulate the first video signal with a frequency which is not recognized by human.

15. The system of claim 12, wherein the modulator is configured to modulate the first video signal with a frequency equal to or higher than 100 Hz.

16. The system of claim 12, wherein the demodulator is configured to demodulate the received video to reproduce the first video signal.

17. The system of claim 16, wherein the demodulator is configured to reproduce the first video signal based on a mean of luminance of each frame of the received video.

18. A transmitter comprising:
one or a plurality of light sources configured to emit a visible light whose amount corresponds to a first drive signal;
a first driver configured to generate the first drive signal based on a luminance signal indicative of an amount of the light the light source is configured to emit;
a display on which a video depending on a second drive signal using the visible light emitted by the light source; and
a modulator configured to, according to transmission data to be transmitted to a receiver, modulate a first video signal indicative of a video configured to be displayed on the display, to generate a second video signal, to generate a second video signal; and
a second driver configured to generate the second drive signal based on the second video signal,
wherein a mean of each pixel signal value in the second video signal during one frame in the first video signal is substantially equal to a corresponding pixel signal value in the frame in the first video signal.

19. The transmitter of claim 18, wherein the modulator is configured to modulate the first video signal such that the transmission data is not recognized by human.

20. The transmitter of claim 18, wherein the modulator is configured to modulate the first video signal with a frequency which is not recognized by human.

* * * * *